(12) United States Patent
Nishtala et al.

(10) Patent No.: US 9,027,019 B2
(45) Date of Patent: May 5, 2015

(54) STORAGE DRIVE VIRTUALIZATION

(75) Inventors: Satya Nishtala, Cupertino, CA (US);
Luca Cafiero, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 255 days.

(21) Appl. No.: 13/200,281

(22) Filed: Sep. 22, 2011

(65) Prior Publication Data

US 2013/0081012 A1 Mar. 28, 2013

(51) Int. Cl.
| | |
|---|---|
| G06F 9/455 | (2006.01) |
| G06F 9/46 | (2006.01) |
| G06F 3/06 | (2006.01) |
| H04L 29/08 | (2006.01) |

(52) U.S. Cl.
CPC ............ *G06F 3/0605* (2013.01); *G06F 3/0608* (2013.01); *G06F 3/0665* (2013.01); *G06F 3/067* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 7,877,466 B2 | 1/2011 | Chandrasekaran | |
| 2003/0145045 A1* | 7/2003 | Pellegrino et al. | ............ 709/203 |
| 2003/0191840 A1 | 10/2003 | Maciel | |
| 2004/0030822 A1* | 2/2004 | Rajan et al. | ........................ 711/4 |
| 2006/0155831 A1* | 7/2006 | Chandrasekaran | ............ 709/220 |
| 2006/0193073 A1* | 8/2006 | Hakamata et al. | ............... 360/69 |
| 2006/0242380 A1* | 10/2006 | Korgaonkar et al. | ......... 711/170 |
| 2007/0168559 A1* | 7/2007 | Tanaka et al. | ................. 709/246 |
| 2007/0214268 A1* | 9/2007 | Laurent et al. | ................ 709/226 |
| 2008/0155243 A1* | 6/2008 | Diep et al. | ......................... 713/2 |
| 2008/0162839 A1* | 7/2008 | Nakamichi et al. | ............ 711/159 |
| 2008/0244598 A1* | 10/2008 | Tolopka et al. | ................ 718/104 |
| 2008/0270564 A1* | 10/2008 | Rangegowda et al. | ......... 709/212 |
| 2008/0270608 A1* | 10/2008 | Matsunami et al. | ........... 709/225 |
| 2009/0007149 A1* | 1/2009 | Lubbers et al. | ................ 719/320 |
| 2009/0132711 A1* | 5/2009 | Groves et al. | ................... 709/226 |
| 2009/0182961 A1* | 7/2009 | Astigarraga et al. | ........... 711/162 |
| 2010/0023566 A1* | 1/2010 | Minamino et al. | ............. 707/205 |
| 2010/0122124 A1* | 5/2010 | Chen et al. | ....................... 714/57 |
| 2010/0235662 A1 | 9/2010 | Nishtala | |
| 2010/0274886 A1* | 10/2010 | Nahum et al. | ................. 709/224 |
| 2010/0293349 A1* | 11/2010 | Lionetti et al. | ................ 711/162 |
| 2010/0312936 A1 | 12/2010 | Cometto et al. | |
| 2011/0016351 A1 | 1/2011 | Turner et al. | |
| 2011/0061049 A1* | 3/2011 | Kobayashi et al. | ................ 718/1 |
| 2011/0185292 A1* | 7/2011 | Chawla et al. | ................ 715/760 |
| 2011/0265083 A1* | 10/2011 | Davis | ................................ 718/1 |
| 2012/0054746 A1* | 3/2012 | Vaghani et al. | .................... 718/1 |
| 2012/0297181 A1* | 11/2012 | Lee | .................................... 713/2 |
| 2012/0331242 A1* | 12/2012 | Shaikh et al. | ................. 711/154 |

* cited by examiner

*Primary Examiner* — Charles Swift
(74) *Attorney, Agent, or Firm* — Cindy Kaplan

(57) ABSTRACT

In one embodiment, a method includes defining a plurality of virtual drives in a physical drive in communication with a plurality of servers, assigning virtualization parameters to each of the virtual drives, and communicating the virtualization parameters to a drive manager located at the physical drive and operable to configure the virtual drives on the physical drive. An apparatus is also disclosed.

14 Claims, 4 Drawing Sheets

STORAGE DRIVE VIRTUALIZATION

TECHNICAL FIELD

The present disclosure relates generally to computer systems, and more particularly, to computer storage virtualization.

BACKGROUND

Capacity of storage drives in computer systems, such as servers is often underutilized. Drive manufacturers tend to maintain the average selling price of a drive while increasing capacity through the use of technological advances. Therefore, it is often not practical to reduce the system cost, even if storage demands do not increase as offered capacity increases. In some applications, it is beneficial to share a drive across multiple servers. In conventional systems, a storage controller is used to implement volume management and carve out volumes from shared drives.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
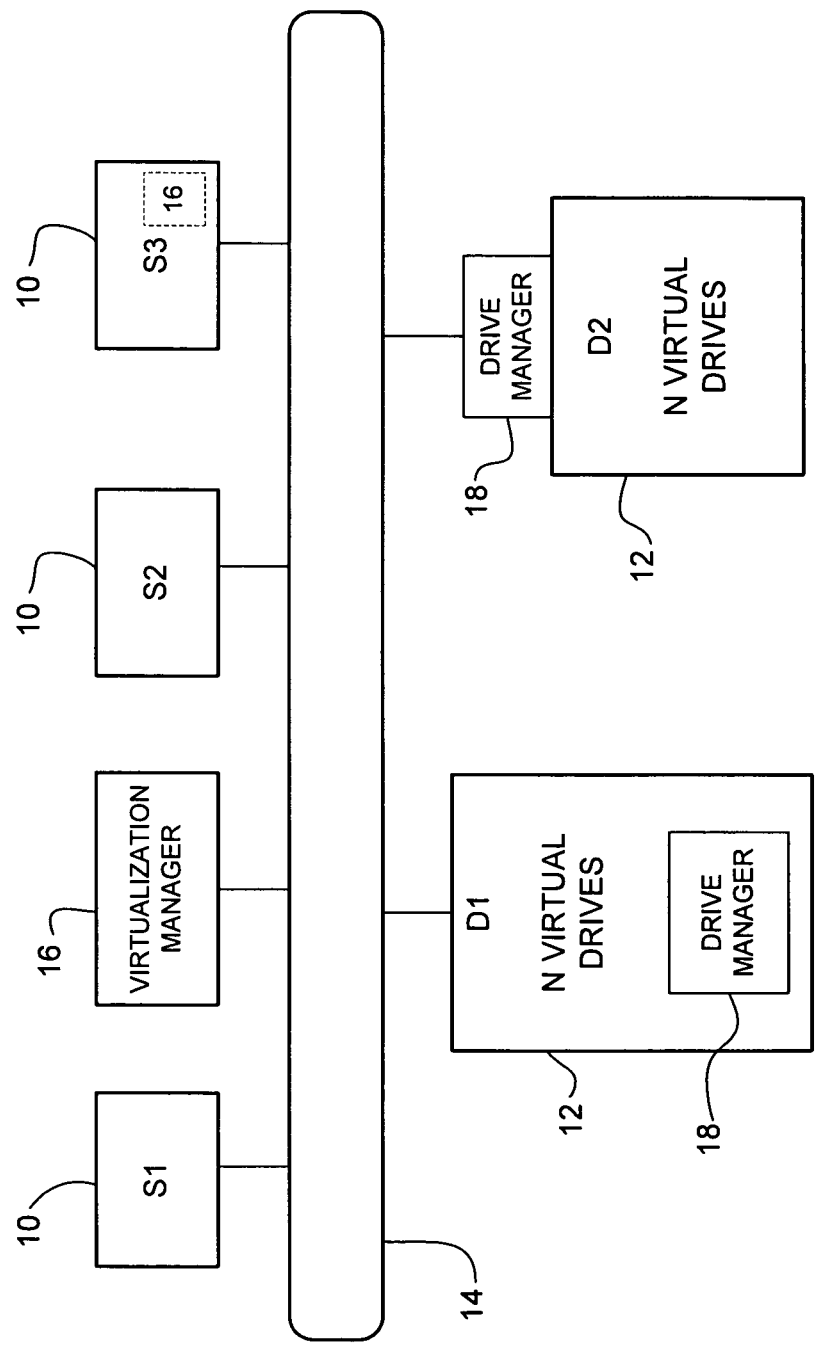
FIG. 1 illustrates an example of a system in which embodiments described herein may be implemented.

In one embodiment, a method generally comprises defining a plurality of virtual drives in a physical drive in communication with a plurality of servers, assigning virtualization parameters to each of the virtual drives, and communicating the virtualization parameters to a drive manager located at the physical drive and operable to configure the virtual drives on the physical drive.

In another embodiment, an apparatus generally comprises a processor for defining a plurality of virtual drives in a physical drive, assigning virtualization parameters to each of the virtual drives, and communicating the virtualization parameters to a drive manager located at the physical drive and operable to configure the virtual drives on the physical drive. The apparatus further includes memory for storing the virtualization parameters.

In yet another embodiment, a system generally comprises a virtualization manager for defining a plurality of virtual drives in a physical drive and assigning virtualization parameters to each of the virtual drives, and a drive manager located at the physical drive and operable to receive the virtualization parameters and configure the virtual drives on the physical drive.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In a network environment, multiple servers may access a group of drives. In cases in which a drive is underutilized by a server, it is useful to share a drive across multiple servers. Conventional systems use volume management implemented at a centralized controller located between the servers and drives to get higher capacity logical drives out of the attached physical drives. In another example, drives may be attached to multiple servers through a zoned fabric that hard assigns a given drive to a given server blade. In this conventional architecture, the number of drives must equal or exceed the number of attached servers, even if this results in allocating more drive capacity to a server than is needed.

The embodiments described herein virtualize a drive to logically partition it at the drive level. Virtualization of the drive capacity at the drive level allows each physical drive to appear as multiple drives so that the system can be configured with fewer drives than required in conventional systems. As described in detail below, a storage drive is virtualized so that it can be shared by multiple devices (e.g., servers). This enables a low cost solution using stateless switching fabrics (e.g., SAS (Serial Attached SCSI (Small Computer System Interface)) expanders, FC (Fibre Channel)-SAS bridges), Ethernet switches, to create a group of drives that can support a large number of servers, offering cost efficiencies. Significant cost savings may be provided by eliminating the need for centralized storage controllers. Partitioning storage at the physical drive level allows system configurations to decouple the number of drives from the number of servers and enables a given set of physical drives to be presented as a larger number of logical drives, both for redundancy and cost purposes.

Referring now to the drawings, and first to FIG. 1, an example of a system in which embodiments described herein may be implemented is shown. For simplification, only a small number of nodes are shown. The system includes a plurality of devices (e.g., servers (hosts) S1, S2, S3) 10 in communication with a plurality of storage devices 12 through a network 14. The storage devices 12 may be, for example, JBOD (Just a Bunch of Disks) comprising a plurality of physical drives (D1, D2). There may be any number of servers (Sn) 10 in communication with any number of drives (Dn) 12. There is no need for a one-to-one correspondence between servers 10 and drives 12 or for the number of drives to exceed the number of servers. There may be, for example, more servers 10 than drives 12, more drives than servers, or the same number of servers and drives. As described below, write operations are performed directly to the drives 12 without a centralized controller and associated cache and volume management.

The server 10 may be a blade server, rack server, virtual server, or any other type of network device or physical or logical component (e.g., virtual machine, virtual desktop) configured to perform server or service operations. In one example, multiple server blades 10 are housed together in a chassis. The servers 10 may operate, for example, in a data center network, and may be configured to host any number of virtual machines.

The drive 12 may be, for example, a SAS (Serial Attached SCSI (Small Computer System Interface)) drive or FC (Fibre Channel) drive comprising a hard disk drive (HDD), solid state drive (SSD), hybrid drive, RAM (Random Access Memory), or any other suitable storage medium. The storage devices 12 may be, for example, direct attached storage for blade servers. In one embodiment, the servers 10 communicate with the drives 12 via a storage protocol that runs SCSI. The servers 10 and drives 12 may communicate, for example, using SAS, FC, SATA (Serial Advanced Technology Attachment), Ethernet, or other suitable protocol.

The network 14 may include any number of nodes including, for example, SAS expanders, SAS switches, FC-SAS bridges, or other network components. The SAS expanders facilitate data transfer between multiple initiator devices (servers 10) and multiple target devices (drives 12). The network 14 may include or be coupled to one or more networks (e.g., local area network, public switched network, virtual local area network, virtual private network, metropolitan area network, wide area network, storage area network, enterprise network, Internet, intranet, or any other network).

As described in detail below, the drives 12 are logically partitioned into n virtual drives at a SAS (or other interface/protocol) level so that each physical drive can be shared by multiple servers 10. This allows the system to decouple the number of drives 12 and the number of servers 10 and enables a given set of physical drives to be presented as a larger number of logical drives. The drives 12 may each have the same number of virtual drives or one or more drives may have a different number of virtual drives. Any number of the logical partitions may be used for redundant storage of data. For example, RAID (Redundant Array of Independent Disks) may be used across the logical devices with RAID functionality located in the servers 10 rather than conventional volume management.

A virtualization manager (management entity) 16 logically partitions the drives 12 and assigns virtualization parameters to the virtual drives. The virtualization manager 16 may be located at one of the servers 10 (virtual server) (e.g., shown in phantom at server S3 in FIG. 1), distributed over two or more of the servers, or located at a standalone network device (e.g., server, appliance) (shown in FIG. 1), for example. The virtualization manager 16 is in communication with drive managers 18 located at each of the physical storage drives 12. As shown in FIG. 1, the drive manager 18 may be implemented as a logical partition on the drive 12, or at an interface between the drive and network 14. For example, the drive manager 18 may be implemented in an adapter configured for attachment to the physical drive 12 and comprising one or more ports for connection to the network 14. Thus, a 'drive manager located at the physical drive' as used herein, may refer to a drive manager 18 at the physical drive 12, coupled to the physical drive, or otherwise interposed between the virtualization manager 16 and one of the physical drives and associated with the physical drive.

It is to be understood that the system shown in FIG. 1 is only an example and that the embodiments described herein may be implemented using different topologies and devices, without departing from the scope of the embodiments.

Figure 2:
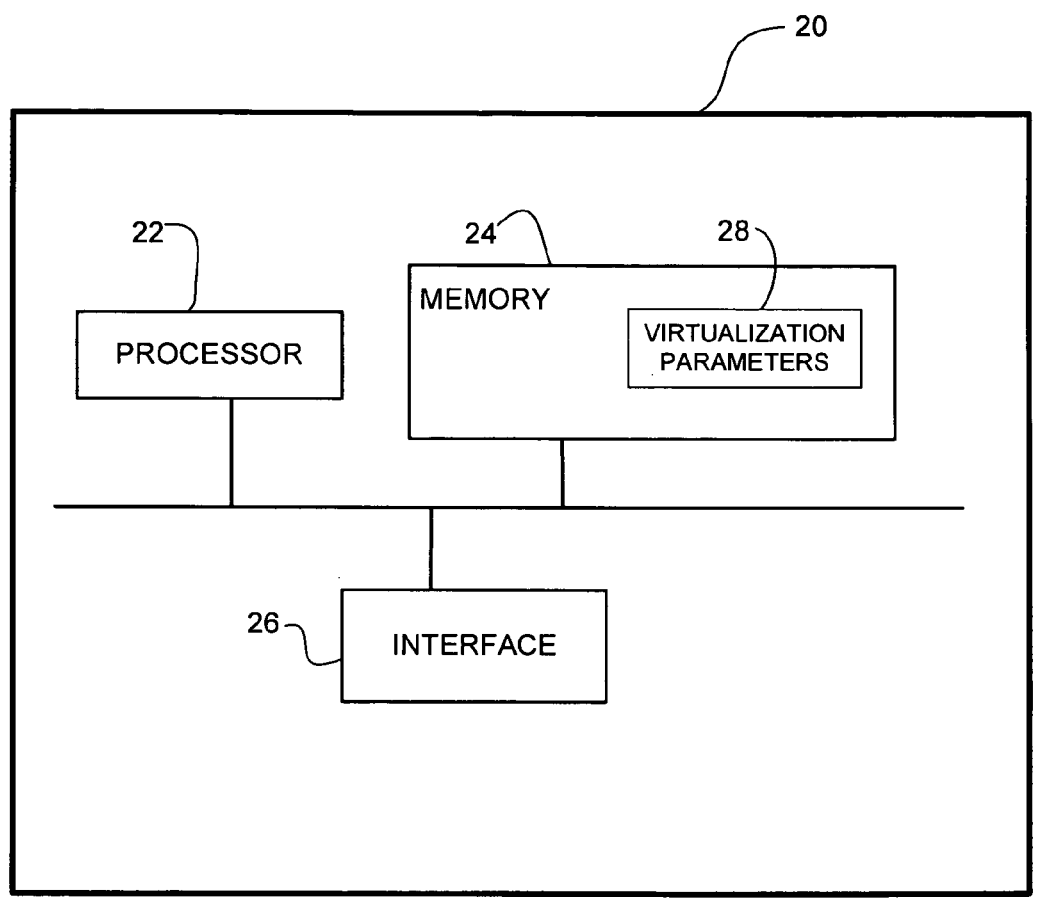
FIG. 2 depicts an example of a network device useful in implementing embodiments described herein.

An example of a network device (e.g., server 10 incorporating virtualization manager 16 or other network device operating as virtualization manager) 20 that may be used to implement embodiments described herein is shown in FIG. 2. In one embodiment, network device 20 is a programmable machine that may be implemented in hardware, software, or any combination thereof. The device 20 includes one or more processors 22, memory 24, and network interface 26. Memory 24 may be a volatile memory or non-volatile storage, which stores various applications, modules, and data for execution and use by the processor 22. For example, memory 24 may include virtualization parameters 28 for the virtual drives.

Logic may be encoded in one or more tangible computer readable media for execution by the processor 22. For example, the processor 22 may execute codes stored in a computer readable medium such as memory 24. The computer readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interface 26 may comprise one or more interfaces (linecards, ports) for receiving data or transmitting data to other devices. The interface 26 may include, for example, an Ethernet, SAS, or Fibre Channel interface for connection to a computer or network.

It is to be understood that the network device shown in FIG. 2 and described above is only an example and that network devices having different components and configurations may be used without departing from the scope of the embodiments.

Figure 3:
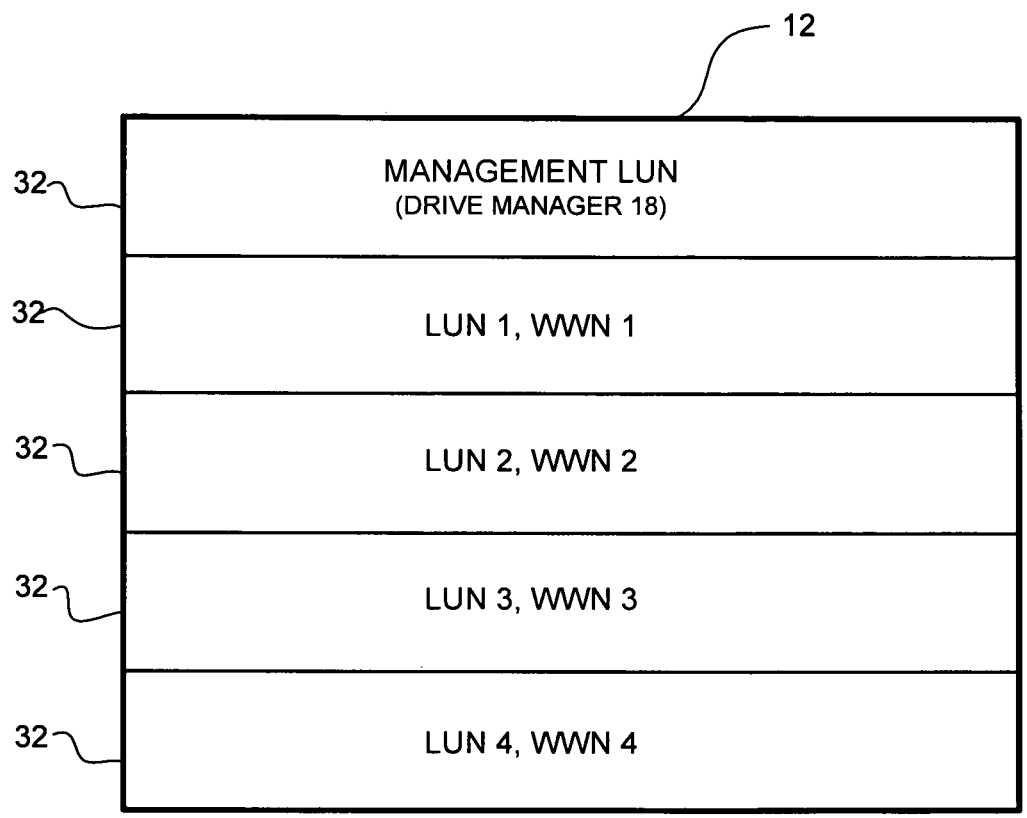
FIG. 3 is a schematic of a drive in the network of FIG. 1.

FIG. 3 schematically illustrates an example of a virtualized drive 12. In one embodiment, the drive's logical address space is split into n logical unit numbers (LUNs) 32. The logical unit number is used to identify a logical unit addressed by SCSI or other protocol. As described below, the LUN is used to identify a partition on the disk drive 12 and may be referred to as a virtual LUN (VLUN). An identifier (e.g., World Wide Name (WWN)) is associated with each of the LUNs 32. Each drive 12 may have a WWN assigned by a vendor (e.g., vendor identifier and vender specified serial number). The virtualization system described herein assigns additional WWNs (virtual WWNs) to each virtual LUN associated with the logical partition. By default, the physical drive 12 will have a single LUN with the WWN defined by the vendor (i.e., non-virtualized drive).

In the example shown in FIG. 3, the drive 12 is partitioned into n=5 LUNs 32, with the virtual drives each assigned a different WWN. In this example, one of the LUNs 32 is identified as a management LUN. The management LUN may be used as the drive manager 18 (FIG. 1). As described above, the drive manager 18 may also be configured external to the drive.

The management LUN (drive manager 18) is used to define the drive LUN definition (e.g., size and WWN for each LUN). The WWN and LUN size (virtualization parameters) for each of the virtual drives is assigned by the virtualization manager 16 (FIG. 1). The management protocol between the virtualization manager and the drive manager may be based on any number of well known management protocols. Extensions to SAS management protocol may be used for communication between the virtualization manager 16 and drive manager 18. In one embodiment, SCSI mode pages are used to implement LUN and WWN definition and assignment. The drives 12 are preferably configured with dual ports. An adapter may be used to convert single port drives to dual port drives. The dual attach drives export each of the virtual drives with a common WWN on both ports.

Figure 4:
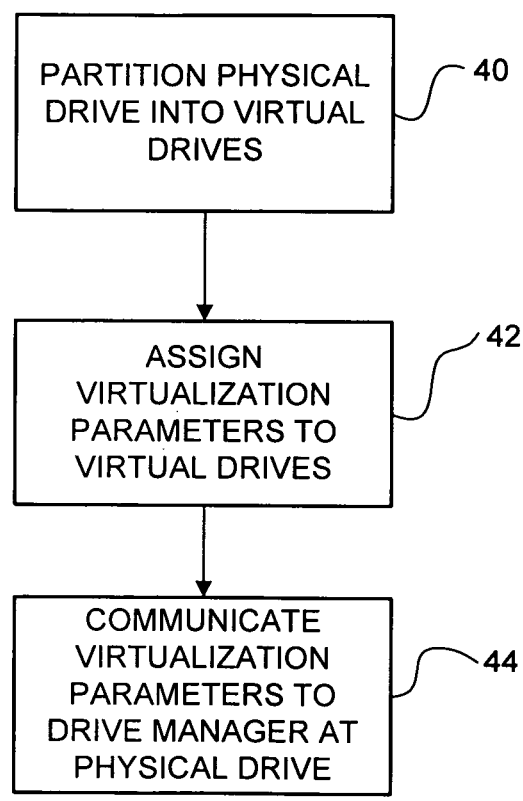
FIG. 4 is a flowchart illustrating an overview of a process for storage drive virtualization, in accordance with one embodiment.

FIG. 4 is a flowchart illustrating an overview of a process for storage drive virtualization, in accordance with one embodiment. At step 40, virtualization manager 16 partitions one or more physical drives 12 into a plurality of virtual drives (n logical units 32 (FIGS. 1 and 3)). The virtualization manager 16 assigns virtualization parameters for each of the virtual drives (step 42). As described above, each virtual drive is assigned a WWN. Drive manager 18 is identified for each physical drive 12 and is used to define (configure) the virtualization parameters (e.g., LUN size, WWN, access properties) assigned by the virtualization manager 16 at the physical drive. In one example, one of the LUNs (e.g., LUN 0) may be defined as a management LUN/drive manager (FIG. 3). The virtualization manager 16 communicates with the drive managers 18 located at each of the physical drives 12 to define the virtualization parameters (step 44). The drives 12 export each of the virtual drives for use by the attached servers 10.

The virtualization manager 16 may dynamically update the number or size of virtual drives at one or more of the physical drives 12 as required. Updates may be performed periodically or upon the occurrence of an event (e.g., change in number of servers 10, change in number of drives 12, increase or decrease in storage requirements).

It is to be understood that the process illustrated in FIG. 4 and described above is only an example and that steps may be modified, added, or combined, without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   defining a plurality of virtual drives in a physical drive in communication with a plurality of servers wherein a logical address space of the physical drive is logically partitioned into a plurality of logical unit numbers at the physical drive level;
   assigning virtualization parameters to each of said virtual drives by a virtualization manager; and
   communicating said virtualization parameters from the virtualization manager to a drive manager located at the physical drive and operable to configure the virtualization parameters assigned by the virtualization manager at the physical drive;
   wherein one of said logical unit numbers comprises the drive manager located at the physical drive and said virtualization parameters comprise an identifier and size for each of said logical unit numbers.

2. The method of claim 1 wherein defining a plurality of virtual drives comprises defining a plurality of virtual drives at a plurality of physical drives.

3. The method of claim 2 wherein the number of physical drives is less than the number of servers.

4. The method of claim 1 wherein assigning said virtualization parameters comprises assigning said virtualization parameters by one of said plurality of servers as a virtualization manager.

5. The method of claim 1 wherein assigning said virtualization parameters comprises assigning a world wide name, size, and access properties to each of said virtual drives.

6. The method of claim 1 wherein communicating said virtualization parameters comprises using a SCSI (Small Computer System Interface) protocol.

7. An apparatus comprising:
   a processor at a virtualization manager for defining a plurality of virtual drives in a physical drive, assigning virtualization parameters to each of said virtual drives, and communicating said virtualization parameters to a drive manager located at the physical drive and operable to configure the virtualization parameters assigned by the virtualization manager at the physical drive; and
   memory for storing said virtualization parameters;
   wherein a logical address space of the physical drive is logically partitioned into a plurality of logical unit numbers at the physical drive level, one of said logical unit numbers comprises the drive manager located at the physical drive, and said virtualization parameters comprise an identifier and size for each of the logical unit numbers.

8. The apparatus of claim 7 wherein defining a plurality of virtual drives comprises defining a plurality of virtual drives at a plurality of physical drives.

9. The apparatus of claim 8 wherein the number of physical drives is less than a number of servers in communication with the physical drives.

10. The apparatus of claim 7 wherein the apparatus is configured for operation at one of a plurality of servers in communication with the physical drive.

11. The apparatus of claim 7 wherein assigning said virtualization parameters comprises assigning a world wide name, size, and access properties to each of said virtual drives.

12. The apparatus of claim 7 wherein communicating said virtualization parameters comprises using a SCSI (Small Computer System Interface) protocol.

13. A system comprising:
   a virtualization manager for defining a plurality of virtual drives in a physical drive and assigning virtualization parameters to each of said virtual drives; and
   a drive manager located at the physical drive and operable to receive said virtualization parameters from the virtualization manager and configure virtualization parameters assigned by the virtualization manager at the physical drive;
   wherein a logical address space of the physical drive is logically partitioned into a plurality of logical unit numbers at the physical drive level and said virtualization parameters comprise an identifier and size for each of the logical unit numbers.

14. The system of claim 13 wherein the physical drive is configured for communication with a plurality of servers operable for performing write operations directly to the physical drive without a storage controller interposed between the servers and physical drive.

* * * * *